Sept. 23, 1969            L. BAKER            3,469,213

DYNAMIC TRANSFER NETWORKS

Filed May 16, 1967            7 Sheets-Sheet 1

INVENTOR
LEONARD BAKER

BY Melvin Pearson Williams
ATTORNEY

FIG. 2

Sept. 23, 1969  L. BAKER  3,469,213
DYNAMIC TRANSFER NETWORKS
Filed May 16, 1967  7 Sheets-Sheet 3

BAND PASS RESPONSE

Sept. 23, 1969  L. BAKER  3,469,213
DYNAMIC TRANSFER NETWORKS
Filed May 16, 1967  7 Sheets-Sheet 4

FIG. 8.

BAND REJECT NETWORK

FIG. 9

BAND REJECT RESPONSE

FIG. 10

2ND ORDER LOW PASS

2ND ORDER LOW PASS WITH FEEDBACK

Sept. 23, 1969     L. BAKER     3,469,213

DYNAMIC TRANSFER NETWORKS

Filed May 16, 1967     7 Sheets-Sheet 7

PRIOR ART

FIG. 15

FIG. 16 even # United States Patent Office 3,469,213
Patented Sept. 23, 1969

3,469,213
DYNAMIC TRANSFER NETWORKS
Leonard Baker, Philadelphia, Pa., assignor to United Aircraft Corporation, East Hartford, Conn., a corporation of Delaware
Filed May 16, 1967, Ser. No. 638,884
Int. Cl. H03h 7/10
U.S. Cl. 333—70                                            25 Claims

ABSTRACT OF THE DISCLOSURE

Transfer networks are provided by means of high-speed sampling of quantized energy between pairs of real capacitive elements bearing a known ratio to one another. In each time segment of the repetitive sampling operation, the energy of the source is divided between the real capacitors, this energy being allowed to build up in one of them, and being repetitively dissipated in another of them. High order and loop configurations are also included, and the networks are capable of use in virtually any configurations, utilizing the design and analysis techniques of the prior art.

BACKGROUND OF THE INVENTION

Field of invention

This invention relates to transfer function components and networks, and more particularly to dynamic transfer function generation.

Description of the prior art

The electronic art has developed so thoroughly in recent years that there are many applications today which could not have found practical implementation with the circuitry and components available ten or twenty years ago. Similarly, there are applications today which cannot properly be implemented for lack of suitable components therefor. For instance, the complexity of mathematical derivation involved in designing impedance networks having particular configurations renders it impractical to provide complex configurations of this type except where the number of networks involved, or the value of the result, is sufficiently high to justify the cost of the computations required. The designing of networks of particular characteristics requires the solving of many high-order equations to determine theoretical or ideal circuit parameters, together with field or bench experimentation with real components to implement the design so as to compensate for real circuit variations in component values caused by circuit interplay and other spurious effects. There is thus a need to simplify the process of synthesizing transfer function networks.

Another factor in circuit design is the need (either direct or indirect) for small-sized components. For instance, in spaceship applications, it is imperative that lowest weight and smallest possible size be utilized for any given electric or electronic circuitry. In other cases, such as in commercial telemetry and/or communications systems, the overall product requirements include the need for the smallest possible component in order to provide not only a capable product, but one which can compete effectively in a modern market.

In aerospace telemetry, guidance, and control systems, it is frequently desirable to provide bandpass filters capable of working in fractions of a hertz. This necessarily requires the use of real circuit elements of a considerable size. For instance, a bathtub capacitor may be required in order to get sufficient capacity in circuits of this type; however, such a capacitor is very large and ungainly for use in aerospace configurations in many instances. Bridging a capacitor across an operational amplifier can amplify the effective capacitance thereof, as is well known in the art. Yet, many circuits must be so small in size so that only picofarads are realizable, and suitable amplification may not be realizable. Thus, there is a need for improvement in achieving large RC time constants with minimum-sized capacitors.

In the prior art, there is a large body of equipment which may require adjustability of center frequency, bandwidth, or phase characteristics. Such equipment may include, for example, monitoring apparatus such as spectrum analyzers and radar countermeasures equipment. In much of the equipment of this type, it has heretofore been necessary to provide mechanically adjustable capacitors, or to utilize circuit element combinations which may be dynamically controlled through the gain of feedback amplifiers, and so forth. However, it is mechanically impractical to use wafer capacitors, mechanical trimmers and complex adjusting means in modern micro technology. It is readily apparent to those skilled in the art that there is a need for more types of adjustable circuit configurations to assist in implementating a variety of equipment, and for improved characteristics among the adjustable circuit configurations of those which are now known.

SUMMARY OF THE INVENTION

An object of the present invention is to provide a transfer network with dynamically adjustable parameters.

Another object of the present invention is to provide a transfer network, the equivalent value of which is essentially independent of size of the real circuit elements of which it is comprised.

Still another object of the present invention is to provide transfer networks capable of substantially any response characteristic as determined by relationships between parameters of dynamically controlled portions thereof.

In accordance with the present invention, a network adapted for interconnection between three terminals comprises a first capacitor for disposition between a pair of the terminals, one side of the capacitor adapted for connection to one of the pair of terminals, means disposed for connecting the other side of said first capacitor alternatively to each of the pair of terminals, repetitively, and a second capacitor disposed for connection between one of the pair of terminals and a third one of the terminals.

According to the present invention, the pair of capacitors are arranged in series with a source and repetitively switched so as, in each sampling period, to initially divide the voltage, applied thereto by the source, between the two capacitors in accordance with the ratio of capacitance between them; the voltage in a first one of them is then dissipated, while the voltage in the second of them is maintained essentially constant; the effect over a plurality of cycles is to develop a voltage change in each capacitor as a function of said ratio of capacitance and the rate of sampling.

In accordance with further aspects of the invention, the application of voltage to the capacitors and the dissipation of voltage in at least one of them, is under the control of sampling means. In certain embodiments of the invention, the sampling means is electronically controlled and adjustable as to the relative times at which portions thereof are opened and closed. This provides significant control over the parameters of the transfer function provided in accordance with the present invention.

In accordance with further aspects of the present invention, in one form, the transfer function may simulate a simple capacitor-resistor network. Adjustment of either the ratio between the capacitors or of the sampling rate will adjust the effective time constant of the synthesized impedance.

The invention also incorporates the use of a plurality of transfer functions, as aforesaid, properly arranged in suitable circuit configurations so as to synthesize a filter network whereby high-order modes of response of varying complexity and with different parameters may be produced by the teachings of the present invention. Furthermore, rough parameters for a synthesized network may be determined by utilizing simplified mathematical design analysis, and the final operating characteristics of the network may be adjusted by adjusting the sampling rate characteristics and/or the ratio of capacitance within the synthesized networks. A plurality of sampling controls may be provided together with a plurality of related groups of capacitors, so that nearly an infinite variety of characteristics are obtainable, in both adjustable and nonadjustable forms, and, where desired, with transfer function characteristics obtained in a given mass of circuitry which is much smaller than the mass of real impedance elements which would otherwise be required to achieve the desired electrical properties.

The invention herewith provides a dynamic transfer network which is the equivalent of a series RC circuit and can be utilized in either low-pass or high-pass configurations. In either configuration, an applied voltage is divided between the two capacitors repetitively, as the voltage across one of the capacitors is allowed to build up, and the voltage across the other capacitor is repetitively dissipated. Thus, over a period of numerous sampling intervals, the voltage across one capacitor rises in an approximately exponential fashion, being suitable for use in virtually all applications which may utilize a simple RC network.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
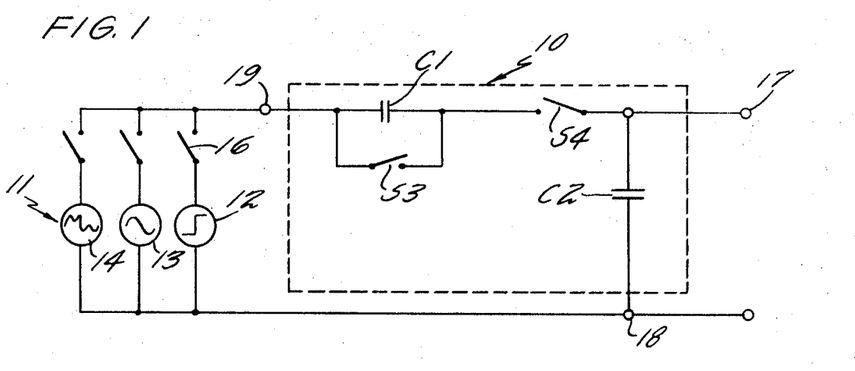
FIG. 1 is a simplified schematic diagram of a circuit illustrating the present invention.

Referring now to FIG. 1, a capacitor 1 (hereinafter sometimes referred to as C1) is connected in series with a switch 4 (hereinafter sometimes referred to as S4) and a second capacitor 2 (hereinafter sometimes referred to as C2) between the terminals of a source 11 which may comprise a step function voltage source 12, a sinusoidal voltage source 13, or a random source or signal input 14. The capacitor 1 may be short-circuited by a switch 3 (hereinafter sometimes referred to as S3). The components 1–4 together comprise a simple transfer network 10 which is an example of an embodiment of the invention herein in a simple form.

The principle of the invention is based upon, in its simplest form, the division of potential between the capacitors 1, 2 when a voltage is applied across them with the switch 4 closed.

Figure 2:
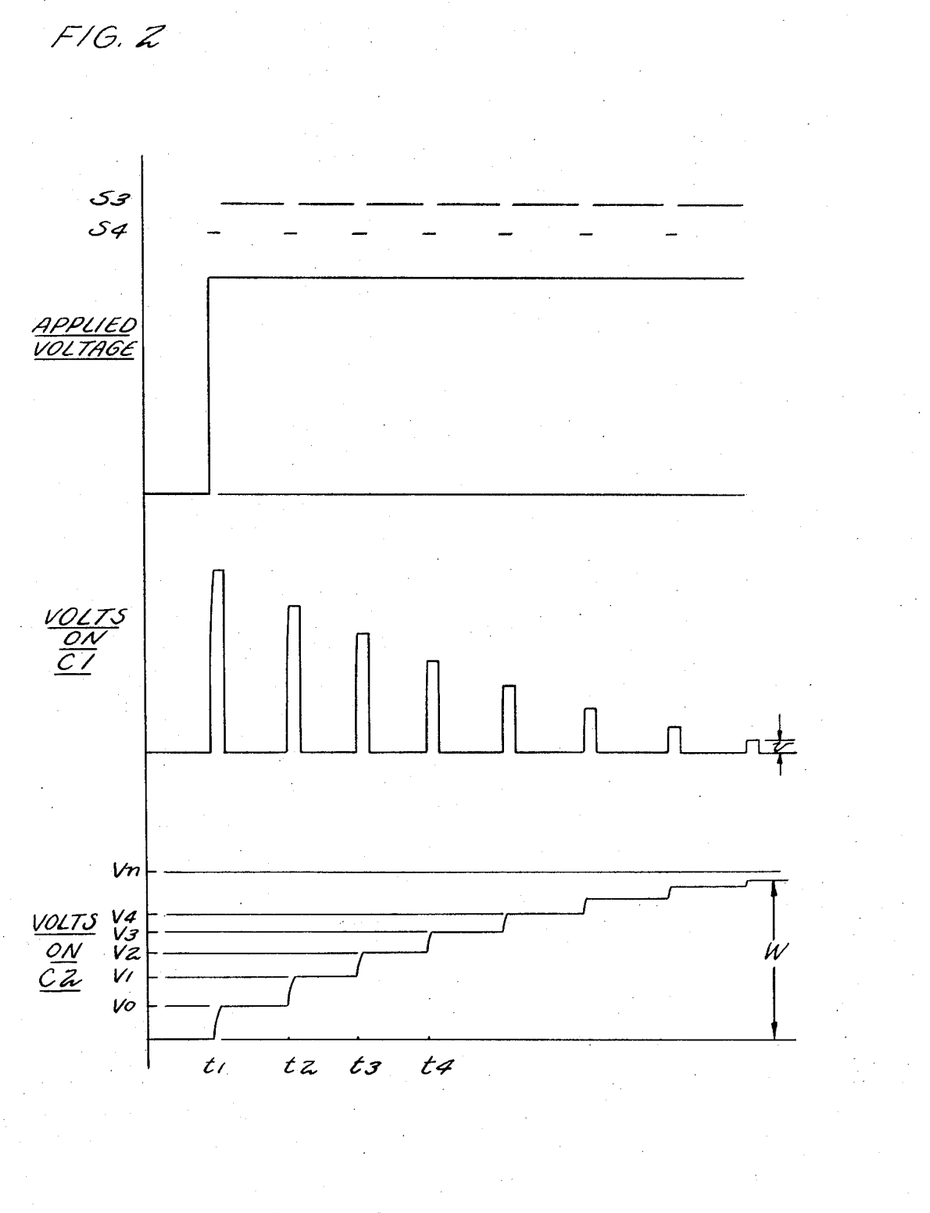
FIG. 2 is a graph illustrating the voltage relationships in the circuit of FIG. 1.

Considering now the voltage relationships illustrated in FIG. 2 in conjunction with the the operation of the circuit of FIG. 1, assume that the step-function source 12 is connected to the transfer network 10 by closing a switch 16. Assume also that the switches S3 and S4 are periodically opened and closed as illustrated at the top of FIG. 2 (solid bar indicating the switch is closed). Taking as an example, time $t1$ when the voltage of the source 12 is applied to the synthetic impedance 10, with switch S4 closed, the maximum voltage of the step-function (source 12) is immediately applied across both C1 and C2, and this voltage will be distributed between them as an inverse function of the capacitance of the respective capacitors. Thus, the voltage across capacitor C1 will be a proportion of the step-function voltage which is determined by the proportion that the capacitance of C2 bears against the total capacitance of C2 and C1, thus:

$$VC2 = V12 \Box \leftarrow C1/(C1+C2)$$

The remainder of the voltage, in an ideal circuit, will be developed across C1. Assuming, for the time being for instructional purposes, that C1 is about a hundred times as large as C2, then about $99/100$ of the voltage of the source 12 will appear across C1, and $1/100$ of the voltage will appear across C2. This is illustrated in the lower two waveforms of FIG. 2. Thus, at time $t2$ when switch 16 is closed applying source 12 to the circuitry of FIG. 1, both C1 and C2 charge slightly exponentially, in dependence upon the real parameters of the circuit, and achieve a maximum charge according to the distribution between them of the voltage applied to the total circuit.

It should be noted that in any given implementation of the present invention, the charge times for the capacitors may vary, but the preferred circuitry for incorporating the present invention would generally be provided with relatively small capacitors and almost no series resistance so that the charging of the capacitors will occur almost instantaneously.

Slightly after time $t1$, the switch 4 is opened, and very slightly thereafter, the switch 3 is closed so as to discharge C1. Since the switch 4 opens before the switch 3 closes, the charge on C2 will be maintained (subject, of course, to load conditions which are described more fully hereinafter). This condition of the switch 3 being closed and switch 4 being open may continue for a time which is greater than a time in which the switch 3 is open and the witch 4 is closed. However, the times are adjustable and the relationships of the timing are described more fully hereinafter. At time $t2$, the setting of the switches is again reversed, so that the switch 3 is first opened and then the switch 4 is closed thus permitting the applied voltage to again be divided between the two capacitors. However, the capacitor 2 has a charge on it, left over from the charging of time $t1$, and therefore the voltage to be distributed between the two capacitors is less than the peak voltage of the source 12 by the amount of the voltage which is retained by the charge in the capacitor 2. Therefore, a lower voltage is available for distribution, but that which is available (the difference between the voltage of the source 12 and the charge remaining on the capacitor 2) will be distributed between the two capacitors in accordance with their ratios as described hereinbefore. This process will continue for each change of the switch positions (each sampling period) so that the capacitor 2 generally acquires, one step at a time, a charge nearly equal to the full value of the potential of the source 12, and each time that the switch 4 is closed with the switch 3 open, there is a lesser and lesser voltage to be distributed between the capacitors (due to the buildup of voltage in the capacitor 2) so that the voltage developed across C1 in each step becomes less and less. Thus, the buildup of voltage across the capacitor 2 (bottom waveform of FIG. 2) roughly approximates the charge time of the capacitor in a very large time constant resistor/capacitor series circuit.

By adjusting the relative sizes of the capacitors 1 and 2 the distribution of voltage between them on each charge portion may be altered. For instance, if the value of C2 were a thousand times the value of C1, then at time $t1$, essentially all of the voltage would appear across C1 and virtually no voltage would appear across C2. It would take many more cycles for the voltage to begin to build up perceptively on C2, so that the net effect would be to make the network 10 look like a much larger RC time constant than in the example illustrated in FIG. 2. On the other hand, if the capacitance of C2 were equal to or less than that of C1, the buildup would require only two or three steps since most of the voltage would be developed across C2 and therefore, even at time $t2$, there would be very little voltage to be distributed between the capacitors, since C2 would have assumed a charge equal to (or greater than) half of the total voltage of the source 12. Thus, it can be seen that the effective size of the time constant represented by the transfer network 10 may be adjusted to quite an extent by adjusting the ratio of capacitance of the capacitors C1 and C2.

Similarly, if the rate of sampling the voltage of the source 11 in the example shown in FIG 2 were increased a hundred fold, it would, of course, take a much lesser time for the capacitor 2 to assume the full voltage of the source 11. Therefore, as the sampling rate increases, the effective RC time constant of the transfer network 10 seems to be smaller, whereas decreasing the switching rate seems to increase the effective RC time constant of the transfer function 10.

A methematical analysis of the foregoing, taking the case illustrated in FIG. 2 for a step function applied to the synthesized impedance 10, is a follows.

Let:

$V$ = the voltage of source 12
$V_0$ = the voltage on C2 after charging in time 0
$V_1$ = the voltage on C2 after charging in time 1
$V_2$ = the voltage on C2 after charging in time 2
$V_n$ = the voltage on C2 after charging in time $n$
$K$ = the ration of capacitance of C2 to the total capacitance of C1 and C2

$$K = C2/(C1+C2)$$

$$V_1 = (V-V_0)\left(\frac{C2}{C1+C2}\right)KV$$

$$V_2 = V_1 + (V-V_1)K = V_1 + KV - KV_1$$
$$= KV + (1-K)V_1$$

$$V_3 = V_2 + (V-V_2)K = V_2 + KV - KV_2$$
$$= KV + (1-K)V_2$$

$$V_n = KV + (1-K)V_{n-1}$$

substituting:

$$V_1 = KV \text{ and } V_2 = KV + (1-K)V_1$$

$$V_2 = KV + (1-K)KV$$

$$V_3 = KV + (1-K)[KV + (1-K)KV]$$
$$= KV + KV(1-K) + KV(1-K)^2$$
$$= KV[1 + (1-K) + (1-K)^2]$$

continuing the induction:

$$V_n = KV[1 + (1-K) + (1-K)^2 + (1-K)^3 \ldots + (1-K)^{n-1}]$$

or, generalizing:

$$V_n = KV[(1-K)^0 + (1-K)^1 + (1-K)^2 + (1-K)^3 \ldots + (1-K)^{n-1}]$$
$$= KV[S]$$

where S = the sum of the geometric series.

As is known in the field of mathematics, $$S = \frac{a\square \leftarrow r^n - 1}{r-1}$$

where:

$a$ = the constant
$r$ = the term which is taken to increasing powers, or the common ratio (the value of any term divided by the preceding term)

thus, $$S = a + a(r)^1 + a(r)^2 + a(r)^3 \ldots + a(r)^{n-1}$$
$$= a[1 + (r)^1 + (r)^2 + (r)^3 \ldots + (r)^{n-1}]$$

Here, $$a = 1$$
$$r = (1-K)$$

So:

$$S = \frac{(1-K)^0[(1-K)^n - 1]}{(1-K)-1} = \frac{(1-K)^n - 1}{-K}$$

and $$V_n = KV[S] = KV\left[\frac{(1-K)^n - 1}{-K}\right]$$

So:

$$V_n = V[1-(1-K)^n]$$

When C1 is very much smaller than C2, e.g., $$C2 = 1000 C1$$

the output voltage across C2 is almost perfectly exponontial in step function increments. When the switching rate is very high, $n$ becomes high, the steps become minute; then, the output is essentially a pure, continuous exponential function nearly identical to the response of a simple low-pass RC network.

For a voltage output taken across terminals 17 and 19, $V_m$ is the difference between the input voltage, V, and the voltage across C2, $V_n$:

$$V_m = V - V_n$$
$$V_m = V - V[1-(1-K)^n]$$
$$V_m = V(1-K)^n$$

This function is nearly identical to the response of a simple high-pass RC network.

To convert the above analysis into a form more useful in the design or synthesis of networks;

Let:

$$(1-K) = e^{-y} \text{ so } (1-K)^n = e^{-yn}$$

taking the natural log of both sides $$n\ln(1-K) = 1yn(1-K) = 1yn(\ln e) = yn(1)$$
$$\ln(1-K) = y$$

If $\ln(1-K)$ is expanded into a well-known mathematical series, and $K \ll 1$, the first term, $-K$, dominates the series, so that:

$$\ln(1-K) = -K$$

Therefore,
$$-K \doteq -y, \text{ so } K \doteq y$$
$$(1-K)^n \doteq e^{-Kn}$$

Substituting in the previous expression for $V_n$,
$$V_n = V[1-(1-K)^n] \doteq V[1-e^{-Kn}]$$

Since the number of switching periods $n$, depends on the elapsed time $t$, and the interval, or period, of each cycle, $T$:
$$n = t/T$$
Therefore,
$$V_n = V\left[1 - e^{-K\left(\frac{t}{T}\right)}\right]$$
$$= V\left[1 - e^{\left(\frac{-K}{T}\right)t}\right]$$

As is known, this is the expression for the exponentially rising output signal of a simple low-pass RC network when a step function voltage is applied to the input thereto, where
$$K/T = \omega_{3db} = 2\pi f_{3db}$$
as is also known.
Thus:
$$f_{3db} = (1/2\pi)(K/T)$$
but $1/T = F_s$, the sampling frequency.
So:
$$f_{3db} = \frac{1}{2\pi} K F_s$$

From the foregoing mathematics it can readily be seen that the three decibel radian corner frequency of a low-pass filter which is designed in accordance with the teachings of the present invention, and which may take the exemplary form as illustrated in FIG. 1, is directly proportional both to the ratio of capacitances (K) and to the sampling frequency ($F_s$). The most significant aspect is, of course, that given any network designed in accordance with the present invention, a variation in the sampling frequency will result in a proportional variation in the corner frequency of a low-pass filter derived therefrom.

Recalling that the expression for the output across terminals 17 and 19 is $V - V_n$; the expression for the voltage, $V_m$, of a high-pass RC network in accordance herewith is:
$$V_m = V - V_n = V - V\left[1 - e^{-\left(\frac{K}{T}\right)t}\right]$$
$$= V e^{-\left(\frac{K}{T}\right)t}$$

Thus, the output of terminals 17, 19 provide a signal which is virtually that of a simple high-pass RC network, the corner frequency of which is directly proportional to the sampling frequency and is varied by varying the sampling frequency, $F_s$.

By viewing the final expression in the mathematical analysis hereinbefore, it is apparent that when the ratio of capacitances, K, is very small, as is true when C2 has a capacitance one hundred or more times greater than that of C1, the sampling frequency must be of the same order of magnitude greater (one hundred or more times) than the corner frequency at which the transfer network in accordance herewith is designed to operate, in order to have operation at the correct frequencies.

Thus, there has been described apparatus in accordance with the present invention in which either a high-pass or a low-pass simple RC network having a variable corner (or three decibel radian) frequency which is directly proportional to the frequency of sampling or switching of the energy in the circuit. By merely varying the sampling frequency, the corner frequency will vary proportionally, an increase in switching frequency yielding an increase in corner frequency which is directly proportional.

From the foregoing, it can be seen that the present invention provides a simple high-pass or low-pass RC transfer function network which, as is well known in the art of network analysis and synthesis, can be utilized not only with a step-function voltage, which is used hereinbefore for illustrative purposes due to its simplicity, but may also be utilized to modify the amplitude and phase of the frequency components of any input signal. Since the art of network analysis and synthesis is so highly developed, further development of the application of the present invention to sinusoidal or other time-variant signals will not be given herein, and reference is made to the prior art to apply well-known teachings to the low-pass or high-pass simple RC transfer network equivalent, with sampling frequency control over corner frequency, in accordance with the present invention.

There is one proviso, however: necessarily, the basic frequency, or the highest significant frequency components, of the input signal should be substantially less than the sampling frequency. For instance, the highest significant frequency of an input signal should be ten or more times lower than a sampling frequency of the apparatus in accordance herewith.

The basic principle of the invention will hold true, and there is no violation in the sampling principle utilized herein (and therefore no likelihood of spurious signals and side effects being generated as a result solely of the sampling), when the variation in the input signal is very small during any sampling period.

Figure 3:
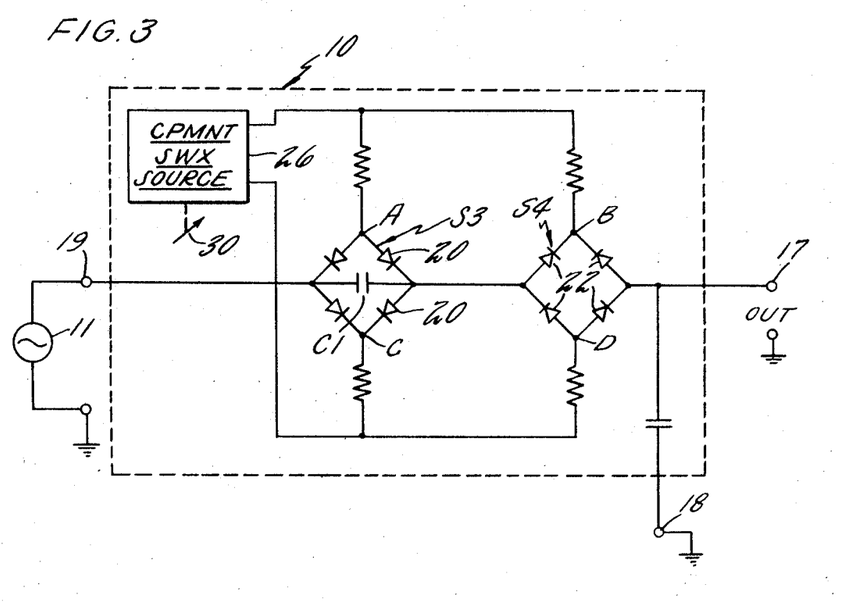
FIG. 3 is a schematic block diagram of an embodiment of the invention of the type illustrated in FIG. 1.

An embodiment of a practical circuit, to perform as illustrated briefly in the simplified schematic of FIG. 1, is shown in FIG. 3. Therein, the switches 3 and 4 each comprise a diode quad switch composed of a plurality of diodes 20, 22. Switch 3 is polled in a polarity opposite to that of switch 4. As shown, switch 3 is polled to be short-circuited with a positive polarity applied to a true output line 24 of a complementary switch source 26, and the diodes 22 of switch 4 are polled to conduct in response to a positive polarity from a complementary output line 28 of the complementary switching source 26. A switching voltage capable of operating the switches 3, 4 according to the mode described with respect to FIGS. 1 and 2 hereinbefore, is illustrated in the waveform plot of FIG. 4. When the line 24 is positive, each of the diodes 20 conduct, thereby short-circuiting the quad switch about the capacitor 1. At this time, since line 28 is negative, each of the diodes 22 in switch 4 are reverse biased and do not conduct, so that S4 represents an open circuit isolating C2 from the source 11 and C1. On the other hand, when the line 28 is positive, the diodes 20 of S3 are reverse biased and do not conduct, which means that C1 is not short-circuited, and simultaneously, the diodes 22 of switch S4 are forward biased thereby causing a short-circuit between C1 and C2 so as to permit charging C1 and C2 in series with the source 11. Thus, the circuit of FIG. 3 is a mere implementation of the ideal simplified circuit shown in FIG. 1.

Figure 4:
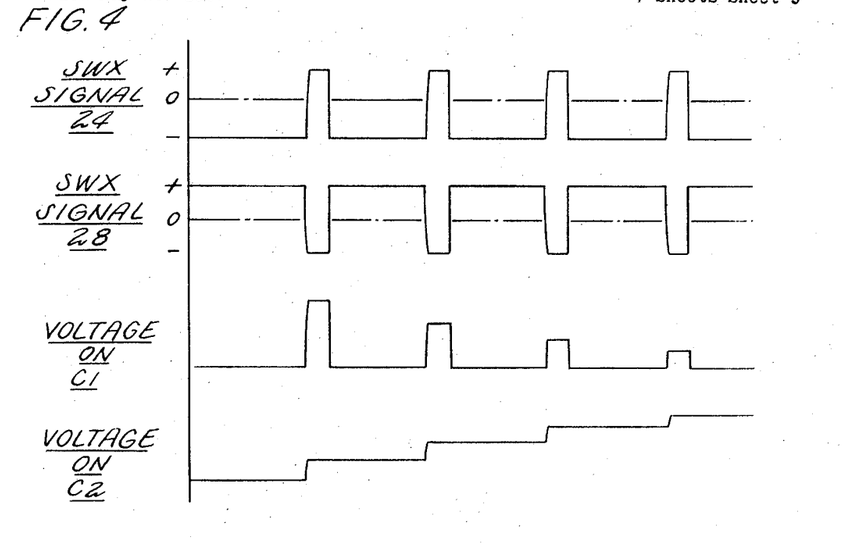
FIG. 4 is a graph illustrating signals in the circuit of FIG. 3.

The complementary switch source 26 may have any configuration capable of supplying the voltage waveform illustrated in FIG. 4. For instance, a complementary output multivibrator of a type well-known in the prior art may be utilized, or any other suitable form of repetitive bipolar signal generator may be used. The complementary switching source 26 may be provided with frequency (or repetition rate) adjusting controls 30 as is well-known in the art. This will permit altering the frequency at which C1 and C2 are charged and C1 is discharged so as to alter the frequency response characteristic of the impedance network of FIG. 3.

In order to utilize the voltage developed between terminals 17 and 19 as the output of the network, which is to utilize the network as a high-pass filter rather than as a low-pass filter, the voltage is equal to the input voltage minus the voltage across C2.

Figures 5A, 5B, 5C, 5D, 5E, 5F, 5G, 5H:
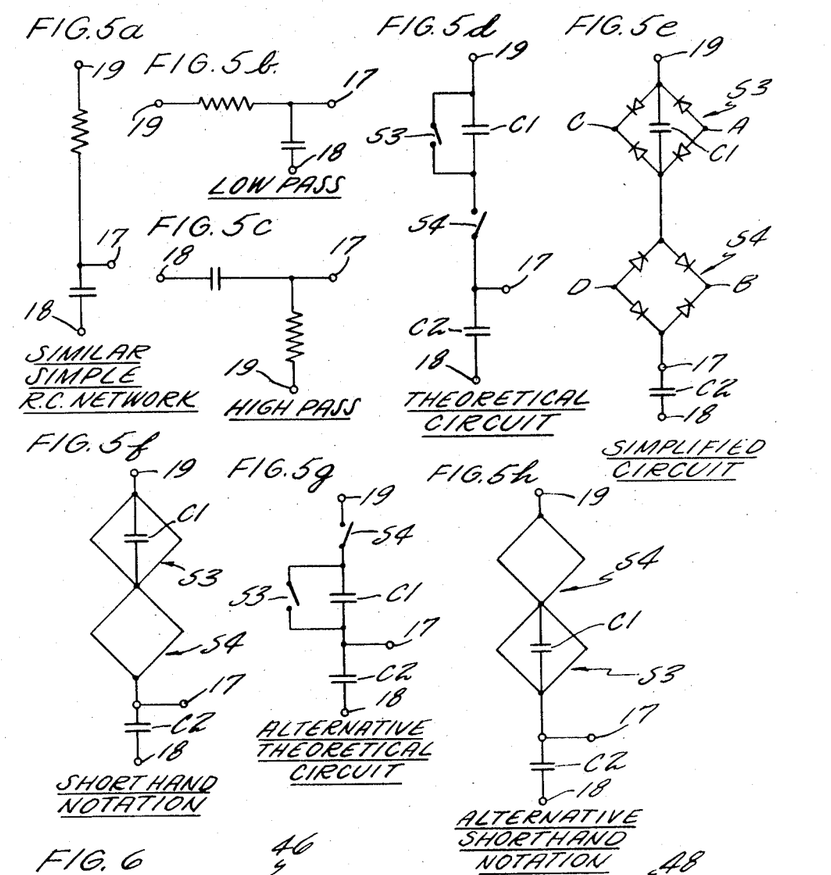
FIGS. 5a–5h are semi-schematic illustrations of the equivalence of the invention herein, in its simplest embodiments, to a simple RC network.

Referring now to FIG. 5, an identity of structure between the circuitry herein and a simple RC series circuit is illustrated. FIG. 5a illustrates a simple RC network. FIGS. 5b and 5c illustrate the circuit of FIG. 5a in well-known low-pass and high-pass configuration, respectively. FIG. 5d illustrates the simple circuit shown in FIG. 1. FIG. 5b is an illustration of the simplified version of the circuit shown in FIG. 3. By arranging the terminals 17, 18, 19 of circuits in accordance with the present invention (that is, the circuit shown in FIG. 5e) so that these terminals appear as desired in either a high-pass or a low-pass equivalent configuration (in accordance with the illustration of FIGS. 5a, 5b, and 5c), any combination of circuits in accordance with the present invention may be made, utilizing techniques of the prior art, as is described more fully hereinafter, so as to form very complex networks including high-order configurations, feedback, amplification, and other circuit arrangements as is known in the network analysis and synthesis art.

Although the invention is described in FIGS. 1–4 with the capacitor 1 and switch 3 adjacent to terminal 19, and switch 4 adjacent to terminal 17, it should be apparent that this positioning could be interchanged as is illustrated in FIGS. 5g and 5h, without in any way altering the operation of the circuit. In other words, the serial configuration of the switch 4 with the parallel combination of capacitor 1 and switch 3 is immaterial. The shorthand notation of FIGS. 5f and 5h is used in the remaining figures, and should be construed as the equivalent of the circuit of FIG. 3.

As described briefly hereinbefore, in order for the theory of the present invention to operate, it is necessary that the capacitors 1, 2 not be loaded by low-impedance load circuits which would cause the discharging of the capacitors, thereby altering the mode of operation. In many configurations, therefore, the output of a network in accordance herewith may preferably be fed to a high input impedance buffer amplifier so as to avoid discharging of either of the capacitors in the network. This is in accordance with techniques which are well-known in the electronics art.

Similarly, the sampling principle, which includes switching energy from a source into two capacitors in series, and then dissipating the energy in one of the capacitors, must be maintained in an operational fashion in any configuration in which the present invention is utilized, or the theory of operation of the present invention will be violated and the apparatus will not work. This means that the sampling frequency of a network in accordance herewith must be considered in the design of higher order networks. Usually, higher order networks may all comprise a plurality of simple networks, the sampling of each of which is controlled by the same sample control signal source as the others. In other cases it is possible to have a plurality of cascaded networks, the input network operating at a first frequency, and networks subsequent thereto operating at frequencies much higher than the first frequency, whereby the output of a first network is literally sampled by ultimate networks in a sequence. Other arrangements can, of course, be made, including the filtering of the output of one network so as to cause it to be essentially a smooth curvilinear function in comparison with switching speeds which are desired for use in a subsequent network which is responsive thereto. When this is done, then the sampling rates of two networks in series can be unrelated within certain limitations of design.

When the buffering and sampling considerations described hereinbefore are accommodated, there is no limit to the manner in which the transfer network in accordance with the present invention may be utilized in place of other circuit elements so as to provide transfer functions in accordance with the teachings of the prior art enhanced by the teachings herein.

One particularly prominent arrangement of networks is a series connection where the output of a first network provides the input to a subsequent network. So long as the sampling rates of the two networks are accommodated as described hereinbefore, there is no limit to the amount of cascading that can be thus accomplished. Similarly, networks can be connected in parallel with one another provided the summing of the output is accomplished in a manner which is consistent with the operation of the individual networks, which in fact is achievable in accordance with the teachings of the prior art. Furthermore, a network in accordance herewith may be utilized to bridge an amplifier, thus amplifying the effective RC time constant of the network in the same fashion as the capacitance of a capacitor is effectively amplified by the Miller effect, when bridged across an amplifier. The use of buffer amplifiers, operational amplifiers, and tuned amplifiers of various kinds, can all be accomplished in any sort of linear or quasi-linear circuitry of the type which is known in the prior art, and the advantages of the present invention may be realized therein.

It should be borne in mind that the present invention provides variable characteristics in the equivalent of a simple RC network, and also provides an RC time constant which depends upon the ratio of the two capacitors contained in the network rather than on the absolute values of the capacitors; the present invention is thus useful in a large number of applications where small size and large time constants are both required, as well as in applications where adjustability is desirable or in applications where adjusting final parameters is desirable due to the difficulty of calculating exact final parameters in some instances.

As far as is known, there is no network configuration for which suitable choices of capacitance and sampling times cannot be determined so as to realize the advantages of the present invention in networks of the type heretofore known in the prior art, and further, to provide functions heretofore unattainable due to the limitations of the prior art. A few exemplary ways in which the present invention may be utilized will be given in order to illustrate that the teachings of the prior art are readily adapted in order to design and analyze transfer function networks utilizing the present invention.

Figure 6:
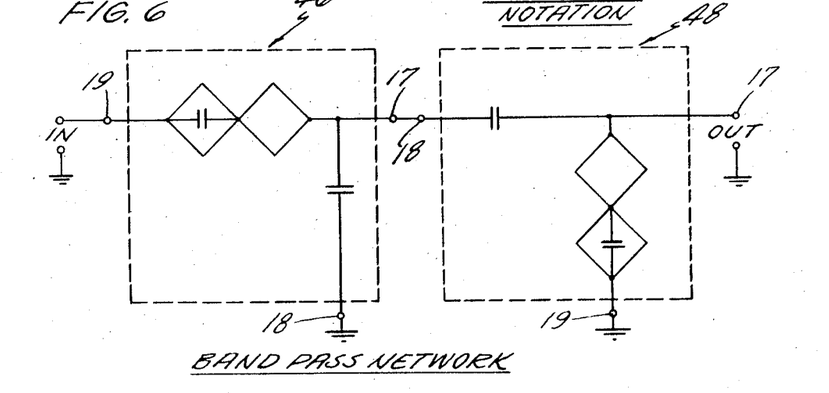
FIG. 6 is a simplified diagram of a simple bandpass network in accordance with the present invention.

Referring to FIG. 6, a simple bandpass filter having six decibel per octave skirts can be constructed by cascading a low-pass filter 46 and a high-pass filter 48 in accordance with the teachings hereinbefore. In order to improve circuit operation, an amplifier may be provided between the two stages, but it is not always necessary. If is, of course, necessary that the switching frequency of the two-cascaded networks be appropriately related.

Figure 7:
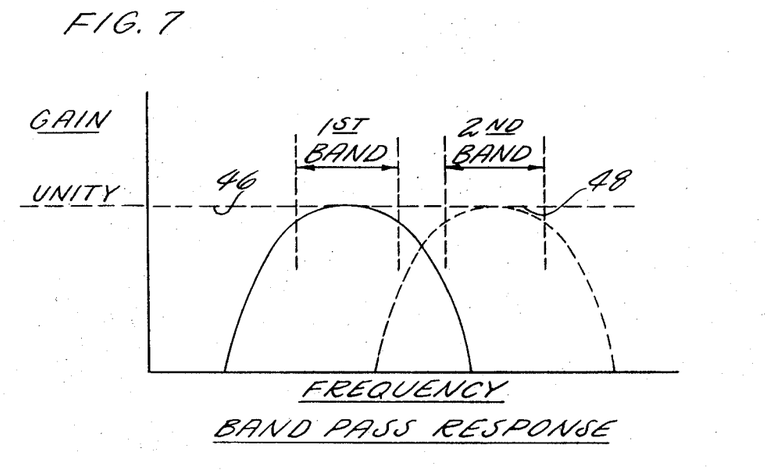
FIG. 7 is a graph illustrating the frequency response of the bandpass network of FIG. 6.

The response of the simple, single-order bandpass network of FIG. 6 is illustrated in FIG. 7. As is known in the art, the bandpass characteristic is achieved because the low-pass filter will not pass frequencies of above a certain value, and the high-pass filter will not pass frequencies below a certain different value. However, frequencies which fall in a band of overlapping frequency response will be passed by the combined cascade network. By adjusting the sampling frequency, the frequency of both the low-pass and high-pass filters will be varied by a commensurate amount, in accordance with the equation for the three decibel frequency hereinbefore. Thus the first band may be moved upwardly to the position of the second band shown in FIG. 7 by increasing the sampling frequency a commensurate amount. Similarly, lowering the sampling frequency would cause a commensurate lowering in the position of the band of passed frequencies within the frequency spectrum in an identical fashion.

Figure 8:
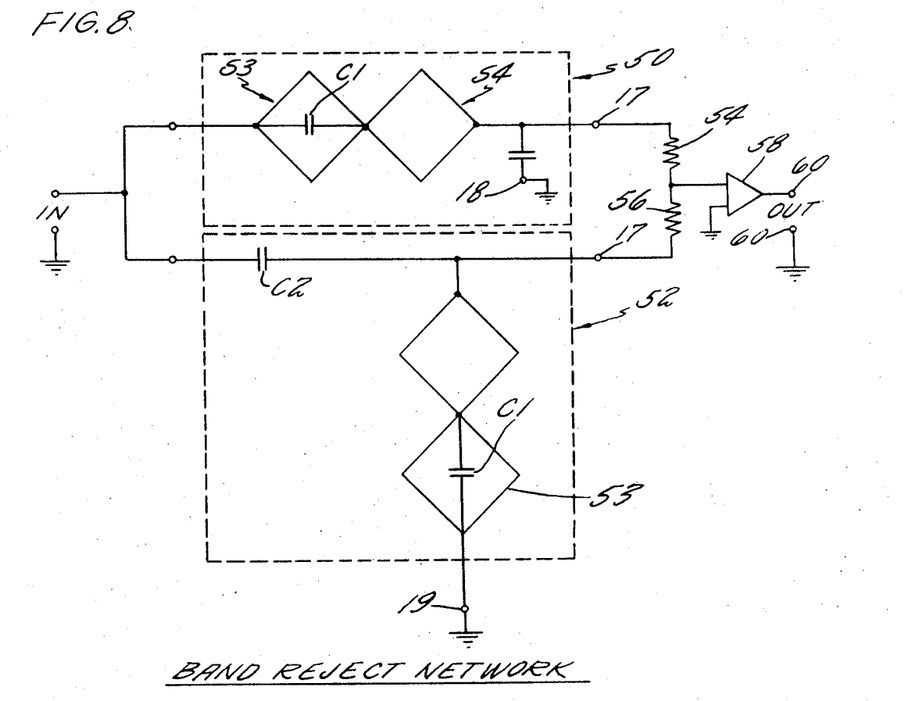
FIG. 8 is a simplified schematic diagram of a simple band reject network in accordance with the present invention.
Figure 9:
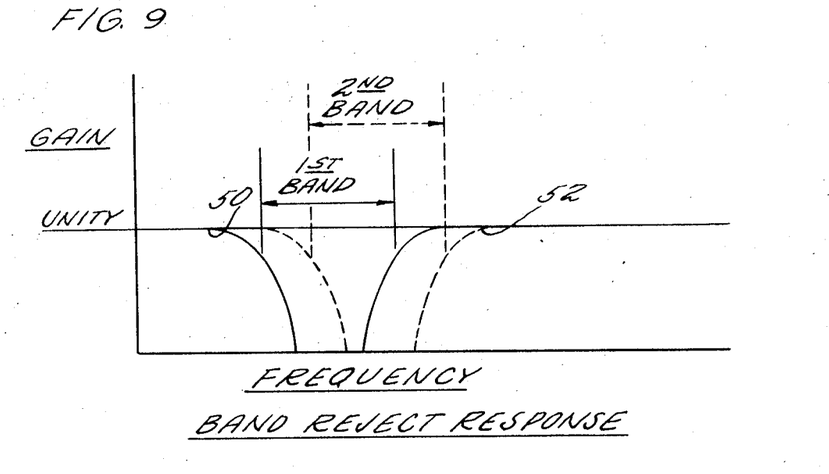
FIG. 9 is an illustration of the frequency response of the simple band reject network of FIG. 8.

A simple band reject network, as illustrated in FIG. 8, comprises a low-pass network 50 connected in parallel with a high-pass network 52, the output of the two networks being summed in a pair of summing resistors 54, 56 and passed through an amplifier 58 to output terminals 60. The well-known characteristic of a simple band reject network is illustrated in FIG. 9. Therein the fact that the low-pass filter has a corner frequency which is lower than the corner frequency of the high-pass filter establishes a band where there is such a low gain that essentially no energy is transferred through either of the networks, and therefore a band of frequencies is rejected.

A first band of rejected frequencies may be lowered as illustrated in FIG. 9 to the position indicated as the second band of rejected frequencies by lowering the sampling frequency of the circuit of FIG. 8 to a commensurate amount. Of course, increasing of the sampling frequency will similarly cause an increase in the band of rejected frequencies.

Figure 10:
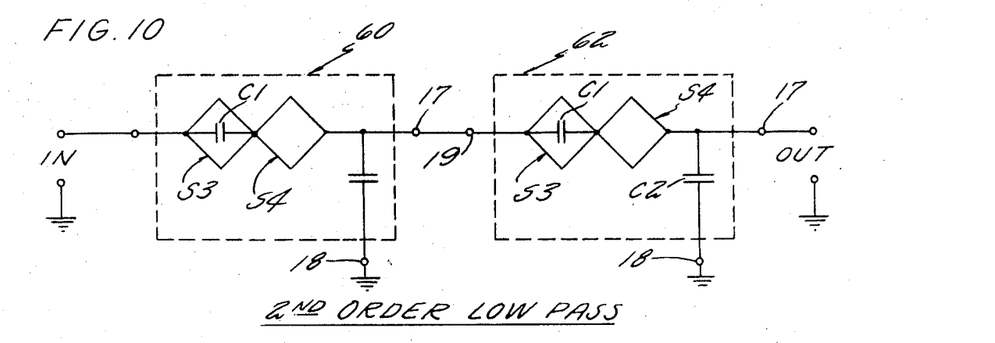
FIG. 10 is a simplified schematic diagram of a second-order, low-pass filter in accordance with the present invention.
Figure 11:
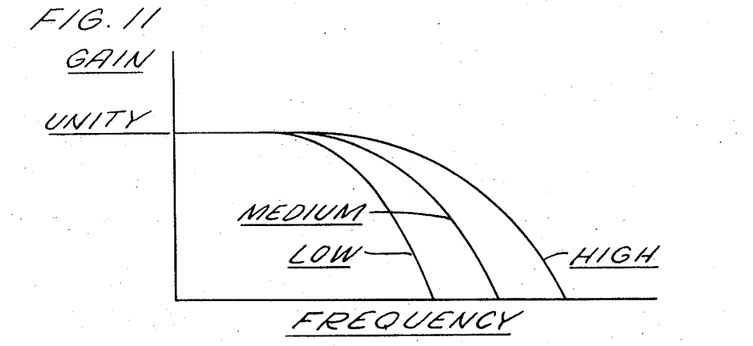
FIG. 11 is an illustration of the frequency response of the second-order, low-pass network of FIG. 10.

To consider another utilization of the present invention which requires cascading, a second order low-pass filter, as illustrated in FIG. 10, is taken as an example. Therein the first low-pass filter 60 feeds a second low-pass filter 62 and, as illustrated in FIG. 11 the frequency response will have a dropoff which is very frequently dependent, but is asymptotic to twelve decibels per octave, in contrast with a dropoff which is asymptotic to six decibels per octave as is the case of a single low-pass filter. Again, by varying the sampling frequency, the corner frequency may be adjusted to any of a variety of low, medium, or high frequencies as illustrated in FIG. 11.

Figure 12:
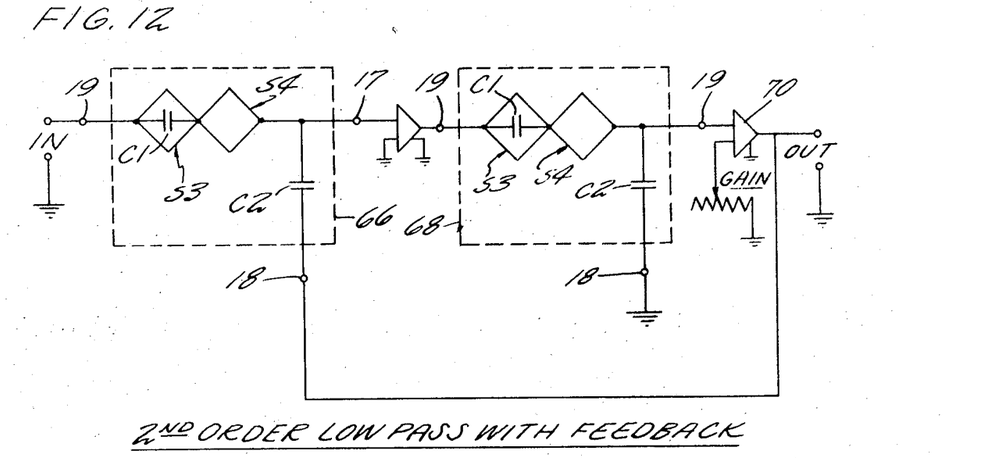
FIG. 12 is a simplified schematic diagram of a second-order, low-pass network with feedback in accordance with the present invention.
Figure 13:
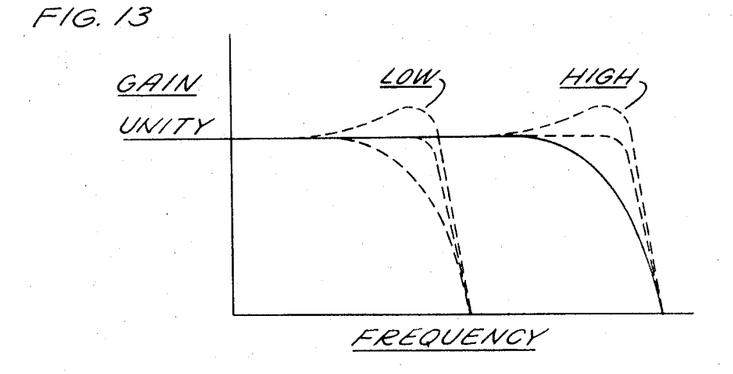
FIG. 13 is an illustration of the frequency response of the second-order low-pass network with feedback of FIG. 12.

A more complex second order low-pass filter with feedback is illustrated in FIG. 12. This will give a response, when the sampling rate is left at a given frequency, which is identical to a similar configuration wherein simple RC networks are utilized in place of the two low-pass networks 66, 68 as shown in FIG. 12. The response of the network of FIG. 12 is illustrated in FIG. 13. When the gain of the amplifiers is low, so there is essentially no feedback, then the response is as indicated by the solid line in FIG. 13. However, if the gain is increased to unity, then the response is like that illustrated by the dashed line in FIG. 13, which has a very sharp characteristic near the corner frequency and approaches the twelve decibels per octave response characteristic at frequencies just slightly higher than the frequencies at which the gain is unity. On the other hand, if the gain of the output amplifier is increased above unity, then the response might equal that shown by the dotted line in FIG. 13 where the gain exceeds unity at a point just prior to the corner frequency, and then assumes the twelve decibel per octave dropoff for higher frequencies. Note that with no feedback, as depicted by the solid curve, the response is very frequently dependent at almost any frequency, its response being merely asymptotic to the twelve decibels per octave response characteristic. On the other hand, with a proper amount of feedback which is achieved by increasing the gain of the amplifier 70, the response can be made to be independent of frequency right up to the corner frequency and then to assume the twelve decibel per octave characteristic. Increasing the gain of the amplifier 70 will increase the response near the corner frequency, and again the response is at twelve decibels per octave for frequencies above the corner frequency. Without regard to gain, the corner frequency can be made higher or lower by varying the sampling frequency.

An oscillator can be made utilizing the circuit of FIG. 12, with the input terminals short-circuited and the gain of the output amplifier 70 increased sufficiently. The frequency at which the circuit will oscillate is the three decibel corner frequency of the two networks 66, 68 which is used in the circuit of FIG. 12. As is known in the art, if the two low-pass networks used are adjusted to have different corner frequencies, then the frequency would not be the frequency of either of the networks, but would be a calculable frequency which is dependent upon the corner frequencies of the two networks. The determination of the resulting frequency can be made in accordance with the teachings of the prior art, in the same fashion as for simple RC networks, since in the case of the present invention, as well as in the case of prior art RC networks, the resulting sinusoidal oscillating frequency will be dependent upon the corner frequencies of the networks involved. In the case of the present invention, the corner frequencies are, of course, determined by K (the capacitance ratio) of each of the networks, and the sampling rate of each network. Thus, whether the same or different sampling frequencies are utilized, different corner frequencies can be obtained in the networks and therefore some different sinusoidal frequency could also be obtained. As is true in the other configurations herein, the K can be determined for each network used, and sampling frequencies for each network can be chosen; then the characteristics of each network is known. Once the characteristic of a network is known (its corner frequency being the essential determinate) virtually any circuit which can be configured with RC networks in the prior art can be configured with the present invention, and thus may utilize to advantage the adjustability of its characteristics, and the simplicity of achieving large RC time constants with relatively small capacitors. As usual, care must be taken so that the principle of sampling described hereinbefore is not violated in the implementation of a synthesized network in accordance with the present invention.

Another function to which the present invention is well suited is the provision of varying phase response without modifying the amplitude of a signal applied thereto. More particularly, the present invention is well suited to providing variable delay networks. Fixed delay networks are well-known and are used in a variety of ways in most of the disciplines of the electronic art. In such a circuit, the input signal is delayed by some amount even though the amplitudes of the various component frequencies remain essentially constant, or are at least modified equally. Such a circuit may be comprised of a high-pass filter in parallel with a low-pass filter where the corner frequency of the high-pass filter is lower than the corner frequency of the low-pass filter. In other words, all low frequencies will pass through the low-pass filter and all high frequencies will pass through the high-pass filter so that there will be essentially no attenuation as to either high or low frequencies, and therefore all frequency components of the input wave will be attenuated approximately the same. However, there is a phase-shift due to either the high-pass or the low-pass network, and thus such a circuit comprises a delay circuit.

A variable delay circuit may be produced in accordance with the present invention by adapting the circuit of FIG. 8, to be operated with suitable choices of K and sampling frequencies, so that the corner frequency of the low-pass network 50 is higher than the corner frequency of the high-pass network 52. Then, the corner frequencies can be raised and lowered in unison by varying the sampling frequency of both networks together, or the sampling rates may be adjusted independently so as to alter only one of the corner frequencies or to alter them both in a differing fashion at the same time. By this method, the delay characteristics can be adjusted in accordance with the teachings of the prior art relative to RC network delay circuits.

Figure 14:
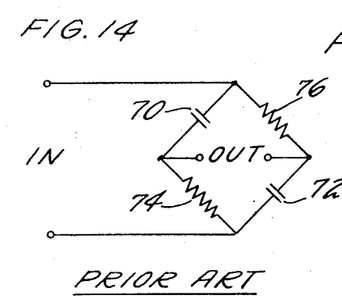
FIG. 14 is a schematic diagram of an all-pass RC bridge delay network known to the prior art.
Figure 16:
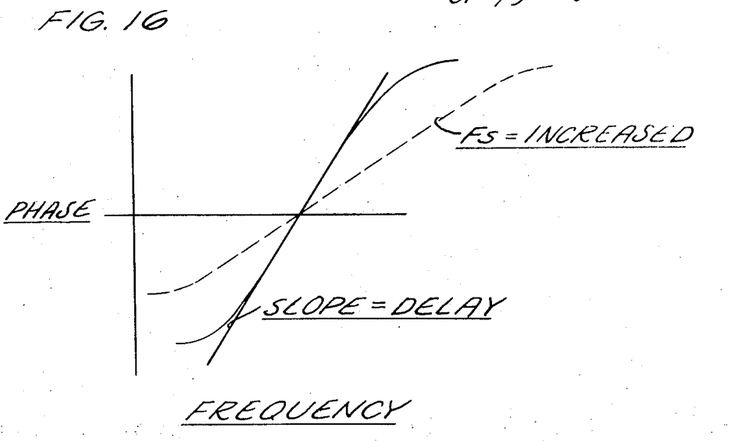
FIG. 16 is an illustration of the delay characteristic of the circuits of FIGS. 14 and 15.

A similar type of all-pass delay circuit which is well known in the prior art comprises a capacitor-resistance birdge as illustrated in FIG. 14. This type of circuit is subtractive, in that the output of a high-pass filter and low-pass filter are subtracted from one another, as is known in the art. As shown in FIG. 16, phase as a function of frequency goes from some negative value to some positive value crossing a zero phase-shift for some given frequency. The time delay of a phase network is the derivative of phase with respect to frequency at any given point; that is to say, the time delay is the slope of the curve. The time delay is generally constant over a substantial range of frequencies, which is equivalent to saying that the slope is relatively fixed over considerable range of frequencies for the circuit of FIG. 14. All this is in accordance with the teachings of the prior art.

Figure 15:
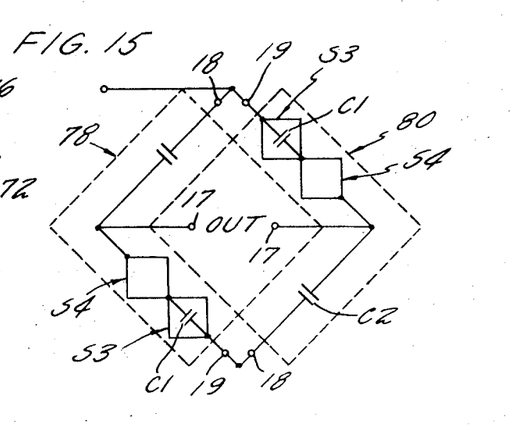
FIG. 15 is a simplified schematic diagram illustrating the incorporation of the invention in a circuit of the type illustrated in FIG. 14.

It is also known in the prior art that the time delay of the circuit of FIG. 14 is a function of the three-decibel points of the RC networks 70, 74; 72, 76, of which the bridge is comprised. Generally speaking, the circuit of FIG. 14 would be so configured that the capacitor 70 equals the capacitor 72 and the resistors 74, 76 are equal. Therefore, only a single-corner frequency is meaningful. Thus, by selecting the value of the capacitors and the resistors so as to provide a known corner frequency, the delay of the device shown in FIG. 14 is determined. The present invention may be used to form an all-pass bridge network for use as a delay circuit, by using two networks 78, 80 as shown in FIG. 15. As described hereinbefore, the corner or three-decibel radian frequency of a device in accordance with the present invention is equal to $$KF_s/2\pi$$

Thus, the time delay of an all-pass filter in accordance with the present invention would be proportional to $$2\pi/KF_s$$

which in turn is proportional to $$\frac{2\pi}{K}T$$

where T=the sampling interval. Therefore, the present invention permits provision of a time delay network in which the delay time is directly proportional to the sampling interval, and therefore, the time delay of a network in accordance herewith can be adjusted by making an inversely proportional adjustment in the sampling frequency. Of course, a time delay of any network formed in accordance with the teachings herein can also be adjusted by varying the frequency, since, as has just been described, the time delay of any network is going to be inversely proportional to the three-decibel or corner frequency of the component networks, and therefore it can be adjusted by adjusting the sampling frequency as is described with respect to the control of the three-decibel or corner frequency hereinbefore. The bridge network described hereinbefore relative to FIGS. 14–16 includes the basic elements which can be made into a Weinbridge oscillator. In fact, any phase-shift type of RC oscillator can be made, and can be made adjustable, and the adjustability can be utilized or controlled in a variety of ways, all in accordance with the present invention, as described hereinbefore.

When more complex networks are involved, regardless of configuration of the circuit, the three-decibel frequency of the elemental networks of which the circuit is comprised will directly correlate with the delay through the overall circuit. The relationship between sampling frequency and the ratio K to the three-decibel frequency can be applied, as is described hereinbefore, so as to determine in any network how to apply the present invention to provide a variable delay in synthesized networks of any configuration.

The networks described herein with respect to FIGS. 6–16 hereinbefore are exemplary merely. The invention herein may be used in any network configuration capable of expression as an arrangement of simple RC networks, as described with respect to FIG. 5, and as proven mathematically, hereinbefore.

Complex networks may be synthesized from the illustrative networks hereinbefore, in accordance with the network design analysis and synthesis techniques of the prior art. Consider a band reject filter which has a very deep rejection response characteristic at both the low and high-pass walls of the rejection band of frequencies. An identical sampling frequency may be used in both the high-pass and low-pass filter elements, and the corner frequencies of the several filter elements can be adjusted to be a proper band apart from one another by having corresponding values of K in the different networks. For instance, for a band rejection filter which will reject between ten and eleven kilocycles, a switching frequency of say ten megacycles could be chosen, and then a K may be chosen for the low-pass filter, at a switching frequency of ten megacycles, which will result in a three decibel or corner frequency of ten kilocycles. The K of the high-pass filter is chosen so that, with a sampling frequency of ten megacycles, the high-pass filter will have a corner frequency of eleven kilocycles. Thereafter, adjustment of the sampling frequency will cause the rejection band to move up and down in the frequency spectrum by an amount proportional to the adjustment in the sampling frequency, and the band of rejection will remain one kilocycle wide because, as the switching frequency is changed, the frequency of each of the networks is changed, but their difference remains a constant, proportional to the difference between the ratio of capacitance (K) in each of the low and high-pass filters.

The present invention is also well suited to the heretofor unattainable function of providing a bandpass or band rejection network in which the width of the band of passed or rejected frequencies can be varied. Additionally, the invention is well suited to making variable width bandpass and band rejection networks in which the center frequency can be either maintained constant, or if desired, by applying different techniques, the center frequency can also be adjusted. All of this can be achieved simply by applying the teachings herein to the adjustment of the sampling frequency in a network having the properly preestablished values of K in the high and low-pass frequency network elements thereof. For instance, in order to achieve a variable frequency bandpass or band rejection filter in which the center frequency is to remain constant, but the bandwidth is to be varied, one could combine high and low-pass networks as described hereinbefore with suitable values of K at a given switching frequency for each of the filters. The switching frequency could then be so disposed that in order to obtain a 20% increase in bandwidth, the frequency of the high-pass filter would be lowered by 10% and the frequency of the low-pass filter would be raised by 10%, yielding an overall bandwidth increase of 20%. On the other hand, if only one of the sampling frequencies were adjusted, then a 10% change in that frequency would give a 10% change in width and a 5% change in center frequency. Other combinations may be applied so as to give all sorts of complex variations in center frequency and bandwidth as a function of one or both sampling frequencies.

There are several different ways in which the adjustability of the present invention may be used. The simplest, or least dynamic usage is in providing final parameter adjustment to a roughly designed network. A manufacturer who is in the business of supplying all kinds of networks, delay units, etc., may have stock items having different centers of range of capability, with an adjustability about the center such that any one item may be adjustable between the item to its left and the item to its right, and by taking an item off the shelf, putting it on a test setup and adjusting the sampling frequency, the detailed requirement for a specific order can be filled. For instance, an amplifier having a given bandwidth and center frequency could be adjusted so as to operate at another center frequency and bandwidth, simply by adjusting the sampling frequencies in the amplifier and then the adjustments could be potted and the amplifier shipped. This is in contrast with designing particular networks to come out with those precise operating characteristics.

A second, more dynamic usage is in test equipment, such as a spectrum analyzer, wherein the operator of the equipment will regularly adjust the response characteristic of the apparatus by adjusting one or more of the sampling frequencies applied to one or more corresponding networks, where any sampling frequency might operate more than one network, and several sampling frequencies might be involved over a plurality of networks.

A third usage is, to provide continuous scanning of the switching frequency so as to scan a response characteristic of a filter such as might be used in the frequency-determining input section of a scanning countermeasures receiver, where even if the frequencies being monitored are in the megacycle range, the switching frequency of the network might be on the order of magnitude of gigacycles (thousands of megacycles).

Another way of using the adjustability of the present invention is to modulate one signal with another by utilizing one signal to control the frequency of switching of the networks within an apparatus, while another signal is being applied to the input of the networks in the apparatus. This form of modulation could include a plurality of input signals used to control a plurality of different switching frequencies on different portions of network complexes utilized in the apparatus, and even a plurality of input signals could be applied to plurality of networks utilizing the same or different sampling frequencies, some of which may be fixed and some of which may be variable. In other words, the teachings hereinbefore illustrate how the device may be utilized as a network for inclusion in synthesized transfer functions of any variety, and how the ratio of capacitance (K) and the sampling frequency ($F_s$) may be varied, may be different, may be adjusted, or may be controlled by other signals so as to supply any combination of adjustability to networks which otherwise can be devised in accordance with the teachings of the prior art.

That which is described herein with respect to higher ordered networks, feedback, cascading, oscillation, etc., incorporates all of the teaching described hereinbefore relative to high-pass and low-pass filters. A fact which should not be neglected is that the ratio of the capacitors, rather than the size of either capacitor, is what determines the value K, which in turn is one of the corner frequency determinants: most significantly, the switching frequency is of paramount importance because of the fact that this will determine the corner or three-decibel frequency, and this in turn will define the characteristics of any combination of filters or networks in accordance herewith by utilizing the techniques of the prior art, once a three-decibel or corner frequency is determined for a given simple network or a component network of a higher ordered network complex.

In general, the utilization of the teachings herein, in accordance with well-known network analysis and network synthesis technology, requires only the application of the device as a low-pass or high-pass filter bearing in mind how the characteristics of the filter are determined and the need to accommodate proper synchronization so that the principle described herein relative to sampling is not violated. Sampling can be achieved by numerous means in addition to the exemplary diode quad switches described hereinbefore.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. A dynamic transfer network adapted for connection to a source of energy, comprising:
   a plurality of energy storage devices;
   means adapted to repetitively interconnect said energy storage devices with said source for definite intervals of time, said energy storage devices being so characterized, and said means being so disposed as to cause energy applied to said energy storage devices to be divided among them; and
   means for repetitively dissipating the energy in one of said energy storage devices, by short-circuiting said one energy storage device, in successive intervals of time which are different from and interleaved with said definite intervals of time.

2. A dynamic transfer network according to claim 1 including means to vary the repetition rate of both of said repetitive means.

3. A three terminal transfer network, adapted for connection between a pair of terminals and a third terminal, comprising:
   a first capacitor, one end of which is adapted for connection to a first terminal of the pair of terminals;
   a second capacitor adapted for connection between the third terminal and one of the pair of terminals, and having a capacitance bearing a known relationship to the capacitance of said first capacitor;
   and sampling means adapted for alternatively connecting the other end of said first capacitor to opposite ones of the pair of terminals.

4. A three terminal transfer network according to claim 3 wherein the capacitance of said second capacitor is very much greater than the capacitance of said first capacitor.

5. A three terminal transfer network according to claim 3 wherein said sampling means includes means for altering the frequency of alternative connections made thereby.

6. A three terminal transfer network according to claim 3 wherein said sampling means and said capacitors are so disposed and adjusted so that said transfer network comprises a filter taken from among the group of simple low-pass filters and simple high-pass filters.

7. A three terminal transfer network comprising:
   a pair of terminals and a third terminal;
   a first capacitor, one end of which is connected to a first terminal of said pair of terminals;
   a second capacitor connected between said third terminal and one of said pair of terminals, and having a capacitance bearing a known relationship to the capacitance of said first capacitor;
   and means for repetitively connecting the other end of said first capacitor to the second one of said pair of terminals and then to said first terminal, alternately.

8. A three terminal transfer network according to claim 7 wherein the capacitance of said second capacitor is very much greater than the capacitance of said first capacitor.

9. A three terminal transfer network according to claim 7 wherein said sampling means includes means for altering the frequency of alternative connections made thereby.

10. A three terminal transfer network according to claim 7 wherein said sampling means and said capacitors are so disposed and adjusted so that said transfer network comprises a filter taken from among the group of simple low-pass filters and simple high-pass filters.

11. A transfer network according to claim 7 including means coupling an input manifestation to the other one of said pair of terminals, said transfer network thereby providing an output manifestation at said one terminal of said pair.

12. A transfer network according to claim 7 including means coupling an input manifestation to said third terminal, said transfer network thereby providing an output manifestation at the other one of said pair of terminals.

13. A transfer network according to claim 7 including means to impress voltages on said third terminal and on the other one of said pair of terminals, and wherein said means for connecting the other end of said capacitor is suitably adjusted and disposed so as to provide a plurality of sampling periods, each period including each of the alternate connections of the other end of said first capacitor, each period thereby causing the difference in potential between said pair of terminals to be divided between said capacitors in accordance with the ratio of their capacitance and also to dissipate the voltage in said first capacitor.

14. A transfer network comprising:
a plurality of three terminal simple networks, each including a pair of terminals and a third terminal, a first capacitor, one end of which is adapted for connection to a first terminal of said pair of terminals, and a second capacitor adapted for connection between said third terminal and one of said pair of terminals, and having a capacitance bearing a known relationship to the capacitance of said first capacitor;
and means adapted for respectively connecting the other end of each of said first capacitors to the second one of the related pair of terminals and then to the corresponding one of said first terminals, alternately.

15. A transfer network according to claim 14 wherein said one of said pair of terminals of a first of said simple networks is connected to the other one of the pair of terminals of a second one of said simple networks, whereby said simple networks are connected in cascade.

16. A transfer network according to claim 14 wherein said one of said pair of terminals of a first of said simple networks is connected to said third terminal of a second one of said simple networks, whereby said simple networks are connected in cascade.

17. A transfer network according to claim 14 wherein means are provided to couple said one of the pair of terminals of said second simple network to said third terminal of said first simple network, whereby feedback is achieved.

18. A transfer network according to claim 14 wherein means are provided to couple said one of the pair of terminals of said second simple network to the other one of the pair of terminals of said first simple network, whereby feedback is achieved.

19. A transfer network according to claim 14 wherein at least a pair of said plurality of simple networks is connected in series relationship with one another in a series circuit.

20. A transfer network according to claim 6 wherein at least a pair of said plurality of simple networks are connected to provide a parallel circuit.

21. A transfer network comprising:
a plurality of capacitors;
a source of electrical energy which is to be subjected to the effects of the transfer network;
means for repetitively interconnecting said capacitors in series with said source for definite intervals of time, said intervals being less than the total time in each of said repetitive steps;
means for repetitively dissipating the energy in one of said capacitors in successive intervals of time which are different from and interleaved with said definite intervals of time; and means connected to one of said capacitors in which the energy is not dissipated by said last named means for coupling an output signal from said low-pass filter.

22. A high-pass filter comprising a transfer network in accordance with claim 21 including means for coupling an output signal from the one of said capacitors in which the energy is dissipated in successive intervals.

23. A dynamic transfer network adapted for connection to a source of energy, comprising:
a plurality of energy storage devices;
means adapted to repetitively interconnect said energy storage devices with said source for definite intervals of time, said energy storage devices being so characterized, and said means being so disposed as to cause energy applied to said energy storage devices to be divided among them;
means for repetitively dissipating the energy in one of said energy storage devices in successive intervals of time which are different from and interleaved with said definite intervals of time;
and means connected to one of said energy storage devices in which the energy is not dissipated by said last named means for coupling an output signal from said transfer network.

24. A dynamic transfer network according to claim 23 including means for coupling an output signal from said one of said energy storage devices in which the energy is dissipated.

25. A transfer network comprising:
a plurality of capacitors;
a source of electrical energy which is to be subjected to the effects of the transfer network;
means for repetitively interconnecting said capacitors in series with said source for definite intervals of time, said intervals being less than the total time in each of said repetitive steps;
and means for repetitively dissipating the energy in one of said capacitors, by short circuiting said one capacitor, in successive intervals of time which are different from and interleaved with said definite intervals of time.

References Cited

UNITED STATES PATENTS

| | | | |
|---|---|---|---|
| 2,485,567 | 10/1949 | Clark | 333—70 XR |
| 2,535,040 | 12/1950 | Clark | 333—70 |
| 2,752,491 | 6/1956 | Ringoen | 333—70 XR |
| 2,822,978 | 2/1958 | Donavan | 333—19 XR |
| 2,829,251 | 4/1958 | Patton | 333—70 XR |

HERMAN K. SAALBACH, Primary Examiner

M. NUSSBAUM, Assistant Examiner

U.S. Cl. X.R.

235—181; 328—134, 165; 333—20, 70